D. R. STUBBS.
BOLL WEEVIL COLLECTOR.
APPLICATION FILED JAN. 17, 1921.

1,413,808.

Patented Apr. 25, 1922.
2 SHEETS—SHEET 1.

D. R. STUBBS.
BOLL WEEVIL COLLECTOR.
APPLICATION FILED JAN. 17, 1921.
1,413,808.
Patented Apr. 25, 1922.
2 SHEETS—SHEET 2.
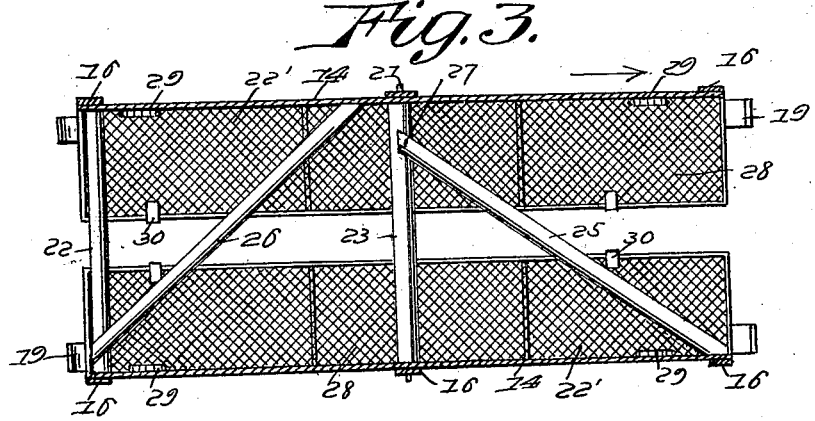
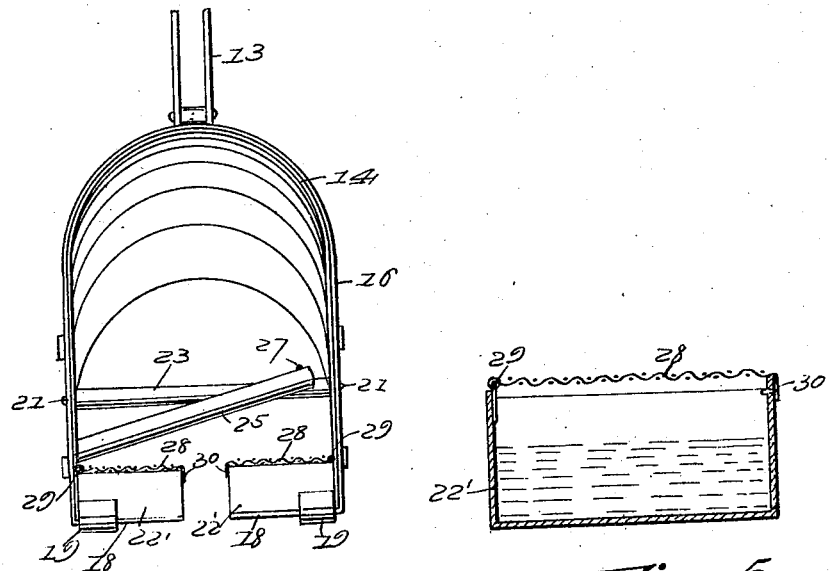

ial view on a
UNITED STATES PATENT OFFICE.

DAVID R. STUBBS, OF CUERO, TEXAS.

BOLL-WEEVIL COLLECTOR.

1,413,808.

Specification of Letters Patent. Patented Apr. 25, 1922.

Application filed January 17, 1921. Serial No. 437,850.

*To all whom it may concern:*

Be it known that I, DAVID R. STUBBS, a citizen of the United States of America, and resident of Cuero, in the county of De Witt and State of Texas, have invented certain new and useful Improvements in Boll-Weevil Collectors, of which the following is a specification.

This invention relates to boll weevil collectors or catchers and has for its object the provision of novel means constituting an attachment for a cultivator to be carried by the said cultivator in order that the cultivation of cotton plants and the dislodging and collecting of boll weevil therefrom may be carried on simultaneously.

An object of this invention is to produce novel means operable to deflect cotton plants so that they will enter a clearance in a housing carried by a cultivator or plow and encounter obstructions which may be termed "beaters" which will prove effective in dislodging the insects from the plants and causing them to fall into collectors carried by the attachment from whence they can be removed.

A still further object of this invention is to produce a collector of the character indicated having receptacles or troughs extending along their lower edges, the said receptacles being preferably supplied with screens to prevent leaves and twigs from falling in the receptacles.

A still further object of this invention is to produce a device of the character indicated in which the beaters are adjustable vertically in the collector casing so that the device can be made adaptable for the plants as they mature and the height of the device may be changed to suit the requirements.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 3 illustrates a sectional view on a line corresponding with the line 3—3 of Fig. 2;

Figure 4 illustrates an end view of the said collector; and

Figure 5 illustrates an enlarged detail sectional view of one of the receptacles.

Figure 1:
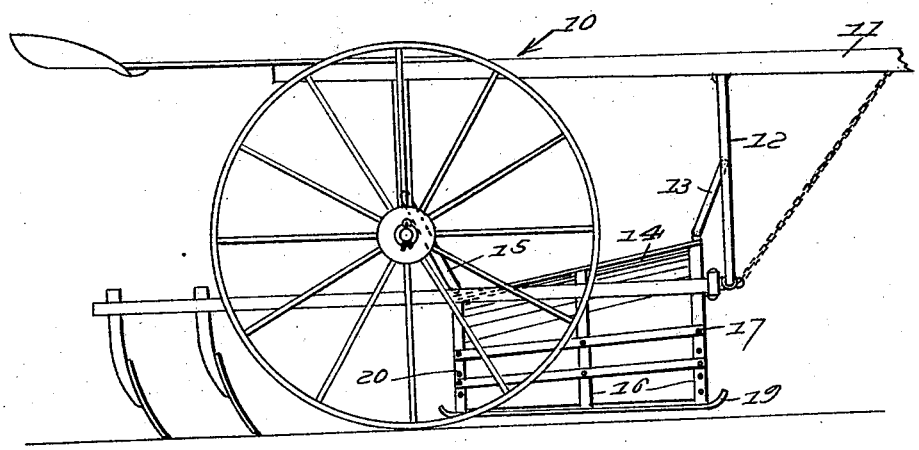
Figure 1 illustrates a view in elevation of a boll weevil collecting device with a fragment of a cultivator in elevation.
Figure 2:
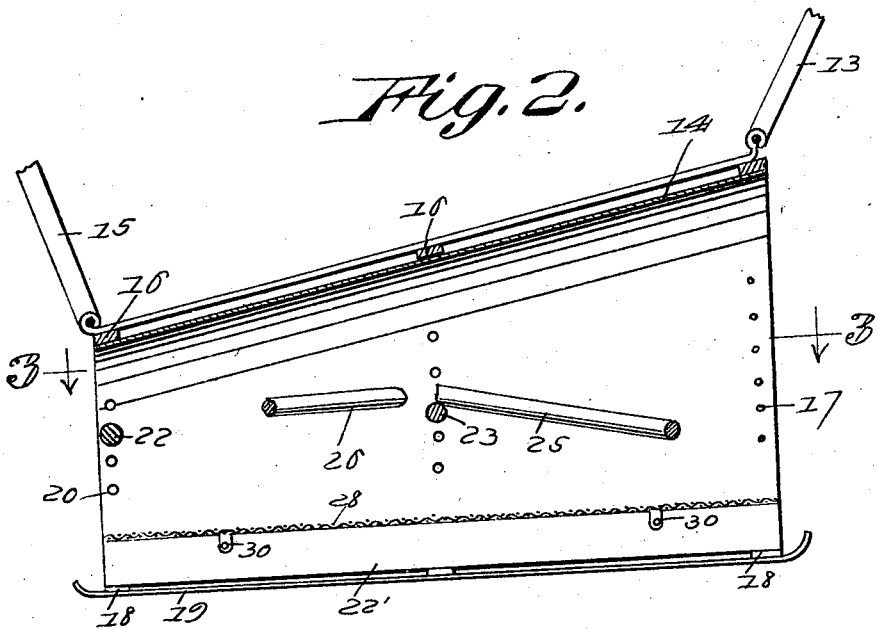
Figure 2 illustrates a vertical sectional view of the said collector.

In these drawings 10 denotes a cultivator which may be of any ordinary construction and as the cultivator is only conventionally shown, it will not be described in detail except to say that it may be provided with a draft rigging or tongue 11 from which a hanger 12 depends, the said hanger constituting a connection for a link 13 extending upwardly from one end of the collector housing 14. The opposite end of the collector housing may have a link 15 connected to it and this may be suspended from any part of the frame of a cultivator so that the lower edge of the collector preferably is parallel with the surface of the soil being cultivated. The top wall of the collector recedes from the front to the rear so that the front opening is larger than the rear opening.

The casing has on its outer surface a series of curved stays 16 which may be attached to the said casing by any suitable fastenings such as rivets 17, and these stays preferably extend inwardly at the bottom of the casing to form supports 18 for the guides or runners 19, one such guide or runner being provided at the lower edge of the housing at each side.

The said housing is further provided with a series of vertically positioned apertures 20 at the rear end and approximately centrally thereof, which series of apertures are intended to receive the fastenings 21 by which the beaters or stays are secured at different positions of adjustment within the casing. The rear beater 22 as well as the central beater 23 are preferably round and they may be made of wood or metal, this being an immaterial detail, and they are to be placed at such height with relation to the casing as to encounter the cotton plants and so agitate them as to dislodge the boll weevil. In order to guide the vegetation and cause it to bend over the receptacles 22′, which are to contain water and oil one of which is stationed on each side of the casing at the bottom, there are placed within the casing, diagonal guiding beaters 25 and 26 which converge at one side of the casing and their outer ends are anchored to one side of the casing near the ends, whereas the converging ends of these diagonally disposed beaters are connected to the central beater in any appropriate way as by fastenings 27.

The receptacles 22' are in spaced relation to each other in the center of the casing, and therefore, as the casing is carried along the rows of vegetation, the space between the inner edges will constitute a clearance for the reception of the stalks of the vegetation, whereas the branches and leaves will be encountered by the beaters and in the first instance, they will be guided along the beater 25 and bent over the receptacle on one side of the casing and after passing under the central beater, they will encounter the rear diagonal beater and will be carried in the opposite direction over the other receptacle, and finally they will encounter the rear beater which will tend to dislodge any remaining insects. The casing is furthermore tapered at the top from the front to the rear thereof.

The receptacles are preferably provided with screen covers of wire mesh 28 secured along their outer edges by hinges 29, and the inner edges of the said cover have clips such as 30 fastening in the walls of the receptacles so that the wire screen may be released to open the receptacles and remove deposits which are collected.

I claim:

1. In a boll weevil collector, a casing having a top and sides with open ends and bottom, the said casing being tapered at the top from the front to the rear thereof, transversely disposed beaters securable therein at different heights, diagonally disposed beaters converging from the ends to a point between the ends of the casing, means for securing the diagonally disposed beaters in place, means for suspending the casing from an implement, receptacles supported along the sides of the casing at the bottom thereof, and runners at the lower edges of the said casing.

2. In a boll weevil collector, a casing having open ends and an open bottom, the said casing being tapered from the front to the rear, transversely disposed beaters securable at different positions of adjustment within the casing, stays on the outer surface of the casing, means for connecting a hanger thereto, diagonally disposed beaters within the casing, receptacles extending along the interior of the casing at its lower edge, and screen covers for the said receptacles containing water and oil.

DAVID R. STUBBS.